(12) United States Patent
Mühlemann

(10) Patent No.: US 9,446,543 B2
(45) Date of Patent: Sep. 20, 2016

(54) INJECTION MOULD WITH HOT RUNNER MANIFOLD

(71) Applicant: FOSTAG FORMENBAU AG, Stein am Rhein (CH)

(72) Inventor: Rolf Mühlemann, Schlattingen (CH)

(73) Assignee: Fostag Formenbau AG, Stein am Rhein ( * ) Notice: Subject to any disclaimer, the term of this patent is extended or adjusted under 35 U.S.C. 154(b) by 0 days.

(21) Appl. No.: 14/649,492

(22) PCT Filed: Oct. 7, 2013

(86) PCT No.: PCT/EP2013/070809
§ 371 (c)(1),
(2) Date: Jun. 3, 2015

(87) PCT Pub. No.: WO2014/086516
PCT Pub. Date: Jun. 12, 2014

(65) Prior Publication Data
US 2015/0343686 A1    Dec. 3, 2015

(30) Foreign Application Priority Data

Dec. 3, 2012   (CH) ......................................... 2668/12
Dec. 19, 2012  (CH) ......................................... 2856/12

(51) Int. Cl.
B29C 45/27         (2006.01)

(52) U.S. Cl.
CPC ....... *B29C 45/2725* (2013.01); *B29C 45/2727* (2013.01); *B29C 2045/273* (2013.01); *B29C 2045/2733* (2013.01); *B29K 2905/00* (2013.01); *B29K 2909/02* (2013.01)

(58) Field of Classification Search
CPC .......... B29C 45/2725; B29C 45/2727; B29C 2045/272; B29C 2045/273; B29C 2045/2733
See application file for complete search history.

(56) References Cited

U.S. PATENT DOCUMENTS

| | | | | |
|---|---|---|---|---|
| 5,762,976 A | * | 6/1998 | Brown | B29C 45/2725 264/297.2 |
| 7,105,123 B2 | * | 9/2006 | Trudeau | B29C 45/27 264/328.14 |
| 7,445,444 B2 | * | 11/2008 | Guenther | B29C 45/2725 425/564 |
| 2003/0075563 A1 | * | 4/2003 | Bazzo | B29C 45/2701 222/146.5 |

FOREIGN PATENT DOCUMENTS

| | | | |
|---|---|---|---|
| EP | 523549 | * | 1/1993 |
| JP | 59-135134 | * | 8/1984 |
| JP | 6-31780 | * | 2/1994 |

* cited by examiner

*Primary Examiner* — James Mackey
(74) *Attorney, Agent, or Firm* — Pauley Erickson & Kottis

(57) ABSTRACT

To simplify the cleaning of hot runner feed lines, and consequently to reduce the downtimes, an injection mold with at least one central feed line and a number of plates arranged one above the other is proposed. The injection mold has at least one hot runner feed line with one or more branching points, at which the hot runner feed line changes direction and/or is divided. In each plate, the hot runner feed line runs in a straight line from the upper surface of a plate to the lower surface of the plate. These hot runner feed lines run straight and at an angle within the plate. At least on one side, the hot runner feed lines open out into exchangeable inserts. For cleaning the injection mold, the exchangeable inserts can be removed from the plates and cleaned separately, while the straight-running hot runner feed lines can be mechanically cleaned in a conventional way.

16 Claims, 3 Drawing Sheets

INJECTION MOULD WITH HOT RUNNER MANIFOLD

BACKGROUND OF THE INVENTION

1. Field of the Invention

This invention relates to an injection moulding tool with at least one central feed conduit, including one or more plates which are arranged over one another, at least one hot runner feed conduit with a branching point or with several branching points, in which a direction change and/or a division of the hot runner feed conduit is effected, for the feed of the hot injection moulding mass to two or more cavities.

2. Discussion of Related Art

Injection moulding tools are tools, by way of which plastic parts are manufactured. They are applied in injection moulding machines, in which an injection moulding mass is heated and in the molten condition is led via so-called hot runner feed conduits to the cavities, in which the respective plastic parts are moulded. Cooling channels which cool the region around the cavities so that the liquid plastic solidifies run in the region of these cavities.

Injection moulding tools must be regularly overhauled, since a certain erosion occurs, which however is relatively low. Deposits which occur in the hot runner feed conduits are more of a problem. These deposits occur to a more or less frequent extent, depending on the type of plastic. Deposits however generally occur with all plastics, independently of whether it is thereby the case of thermoplastics or duroplasts. Generally, it can however be said that the higher the processing temperature, the more deposits occur. Of course all regions of the injection mould which come into contact with the hot injection moulding mass are considered. However, it is known that deposits in the injection mould cavity tend to be inherent of a poor bleeding of the injection mould and tend to indicate a design fault, whereas deposits in the hot runner feed conduits unavoidably occur with certain plastics, even if no overheating is present.

As a result, one can assume that one main problem of the deposits occurs in the hot runner feed conduits, in the case of a correct design and temperature control. The cleaning of these hot runner feed conduits however requires a considerable amount of effort. The course of the hot runner feed conduits in the injection moulds is not at all in simple straight lines, but within the injection mould runs from one direction change point to the next in a straight manner or also from one branching point to the next branching point or from one direction change point to a branching point in a straight line.

An injection moulding tool of the state of the art is shown in FIG. 3. In the present embodiment, it includes two plates, specifically an upper base plate A and of a lower base plate B. On the one hand, the central hot runner feed conduit C is located in the upper plate A, and different hot runner feed conduits E lead from a branching point D in the horizontal direction. These hot runner feed conduits E are realized by a continuous horizontal bore and these bores are then closed by plugs G up to the direction change point F. The hot injection moulding mass via an injection valve J finally gets into a cavity H via a further section of the hot runner feed conduit F.

If the hot runner feed conduits need to the cleaned, then the plugs G need to be drilled out, the conduits cleaned and new plugs inserted thereafter. This effort cannot be carried out at the injection moulding business itself, and the respective injection mould must be sent back to the mould construction company where this service work is then carried out. A production interruption of at least several days, but mostly of several weeks thus arises.

Although different documents, such as Great Britain Patent Reference GB 1 299 094 or German Patent Reference DE 10 2008 045701-A or also EPO Patent Reference EP 2 263 845 B show injection moulding tools with hot runner feed conduits, these documents however concern themselves with other problems, for example with a special feed of these hot runner feed conduits, in order with this to reduce the build-up of deposits.

SUMMARY OF THE INVENTION

As a result, it is one object of this invention to provide an injection moulding tool which is designed so that its hot runner feed conduits are significantly simpler to clean, and as a result the interruption times for the cleaning of the tool and the costs which this entails are reduced.

This object and others are achieved by an injection moulding tool of the initially mentioned above, which is characterized by the hot runner feed conduits in each plate of the injection mould running in a straight line from the upper surface to the lower surface of this plate and inclined to the upper or lower surface, and at least at one side run out into exchangeable inserts, in which the distribution or the direction change of a hot runner feed conduit is affected.

BRIEF DESCRIPTION OF THE DRAWINGS

One embodiment of the subject matter of this invention is represented in the drawing, and is explained wherein.

DETAILED DESCRIPTION OF THE INVENTION

Figure 3:
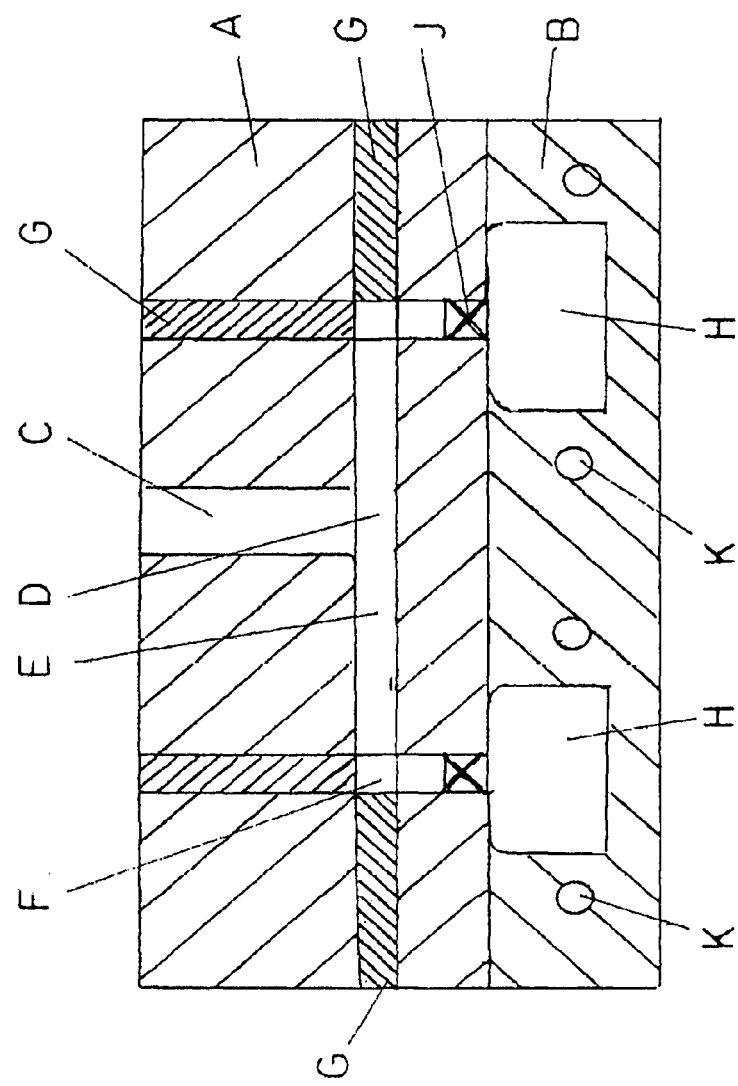
FIG. 3 is a simplified diagram showing an injection tool of a conventional construction manner, as already described above in a detailed manner.

The description of an injection moulding tool according to the state of the art, as is represented in a simplified manner in FIG. 3, is not repeated.

Figure 1:
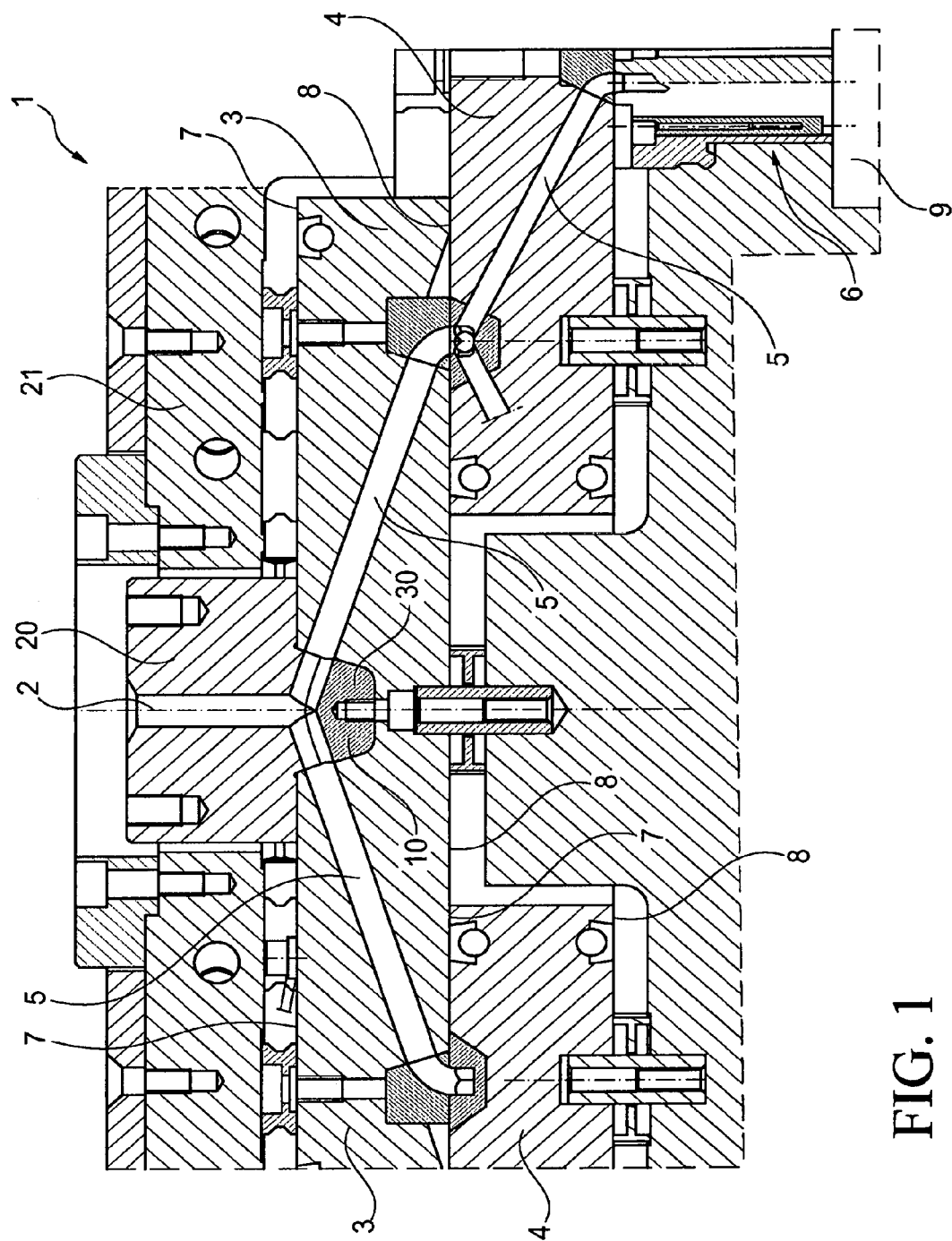
FIG. 1 is one embodiment of an injection moulding tool which is designed according to this invention.
Figure 2:
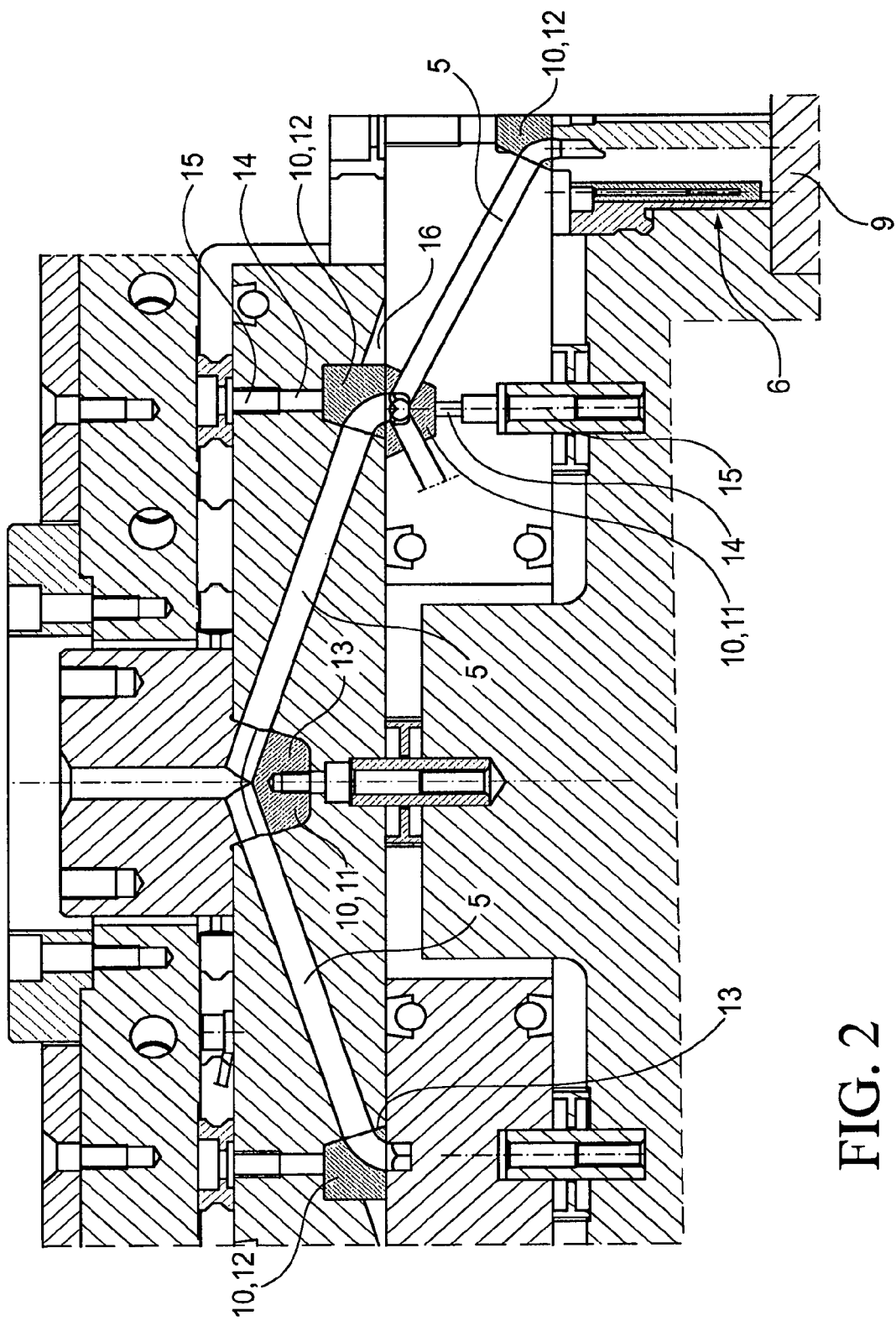
FIG. 2 shows the same injection moulding tool as in FIG. 1 again represented identically, for relieving the figure of too many reference numerals.

A section of an injection moulding tool according to this invention is represented in FIGS. 1 and 2. The injection moulding tool in its entirety is indicated at numeral 1. At the very top, one recognizes a central feed conduit 2 which is shaped into a sprue bushing 20. The sprue bushing 20 is held in a fixation plate 21. The sprue bushing 20 with the central feed conduit 2 which is connected to an extruder or injection moulding assembly of the injection moulding machine, which are not shown here, rests on an upper plate 3. The plate 3 in turn lies on a lower plate 4. The individual plates here are releasably connected to one another by means which are not explained further.

Heating means are arranged in the individual plates. The heating means can be electrically insulated heating rods or also hot runners, through which a heating fluid is pumped. A further explanation of the heating means is omitted since these are conventional and are independent of this invention with regard to their design.

Each plate 3, 4 of an injection moulding tool 1 has an upper surface 7 and a lower surface 8. The number of the required plates 3, 4 increases depending on the complexity of the injection moulding tool 1. The terms upper plate 3 and lower plate 4 are to be seen as relation details of two adjacent plates. As the case may be, with an injection moulding tool 1 with three respective plates, for example, the middle plate with regard to the plate lying therebelow forms the upper plate or with regard to the plate lying thereabove forms the lower plate.

Each plate however has an upper surface 7 and a lower surface 8.

The central feed conduit 2 in the sprue bushing 20 runs out into an exchangeable insert 10 of the upper plate 3. For this, a recess 30 is formed in the upper surface 7 of the upper plate 3. In the example represented here, the sprue bush 20 partly engages into the recess 30. The sprue bush 30 practically forms the upper side of the hot runner feed conduits 5 which connect below the central feed conduit 2 and which branch from here. Whereas here, the lower halves of the branching hot runner feed conduits 5 are formed by the respective exchangeable insert 10, here the upper halves of the branching hot runner feed conduits 5 are formed by the parts of the sprue bushing 20 which engage into the recess 30.

This design however is not compelling and the hot runner feed conduits 5 can also be completely formed in the exchangeable insert 10.

Basically, one differentiates between different types of inserts, specifically on the one hand manifold (distribution) inserts which are indicated at 11, and on the other hand deflection inserts which merely serve to realize a direction change of the hot runner feed conduit 5. As already mentioned, the manifold (distribution) inserts are indicated at 11, the deflection inserts are indicated at 12. However, it is always the case of exchangeable inserts 10 in both cases.

The exchangeable inserts 10, 11, 12 are preferably designed so that these taper in a closure direction, in order to simplify their exchangeability. These exchangeable inserts in the normal case are designed in a polygonal manner in a plan view, and that surface of the exchangeable inserts 10, into which the hot runner feed conduit 5 runs out, is indicated at 13. These run-out or exits surfaces 13 are preferably inclined so that these run perpendicularly to the running direction of the hot runner feed conduit which runs out, which is to say exits there.

Basically, the exchangeable inserts can be cubic, cylindrical with perpendicular walls or truncated-cone-like or truncated-pyramid-like with inclined walls.

If with regard to the exchangeable insert 10, it is the case of a manifold insert 11, then this has at least two exit surfaces 13. Basically, the manifold inserts can be polygonal and not only two hot runner feed conduits can branch therefrom without any problem, but these hot runner feed conduits can be arranged in a star-like manner, so that a multitude of hot runner feed conduits can branch off. Two to maximally eight such branching hot runner feed conduits are usually present. With injection moulding tools of the type considered here, and which in technical terms are called hot-runners, one designates the injection moulding tool according to the number of cavities 9 provided therein. The cavities are the hollow spaces which are to be filled with the hot injection moulding mass. If, for example, one has a tool with sixteen cavities, then one speaks of a 16-cavity tool or mould. In such a case, one would mostly incorporate four hot runners 5 in the upper plate 3 from the manifold insert 11, which are then recessed into deflection inserts 12 in the upper plate 3 at its lower side. The deflection inserts 12 then in turn run out in manifold inserts 11 in the upper surface of the lower plate 4, wherein again four hot runners feed conduits 5 branch away from each manifold insert 11 and these then, for example, run out into sixteen cavities via sixteen deflection inserts 12. Then only deflection inserts 12 continue to be present in the lower surface of the lowermost plate which is in connection with the cavities 9.

Although the exchangeable inserts 10 with the preferred embodiment are represented here tapering from the upper side of the plate to the base of the recess 30 and thus running inclined to the upper or lower surface 7, 8 of the respective upper or lower plate 3, 4, it is also possible to design the side surfaces of the exchangeable inserts running perpendicularly to the upper or lower surfaces of the respective plate. This is possible not least since one preferably incorporates a bore 14 in each case from the surface lying opposite the recess 30, perpendicularly to the plate surface, the bore has a suitable inner thread in which screws can be inserted, and by which a pressure can be exerted onto the respective exchangeable inserts 10, 11, 12. With this, the inserts can be fastened to the respective surface in an aligned and highly precise manner, and in particular the inserts can be easily ejected for cleaning. Accordingly, the bores are indicated as ejection bores 14. The respective ejection screws 15 which are mounted therein have a corresponding outer thread which matches the threaded bore 14. These screws serve for the fastening as well as disassembly of the exchangeable inserts 10, 11, 12.

If deposits occur on the hot runner feed conduits, then this leads to these deposits forming an insulation layer, and as a result the heat of the injection moulding tool can no longer be led correctly to the injection moulding mass. The temperature of the injection moulding mass as a result is too low on entry into the cavity, and this can be recognized on the finished parts by the plastics technician. This can be briefly compensated by one increasing the temperature of the injection moulding tool, but deposits or combusted which is to say carbonized particles are thus increasingly formed. These particles are visible in the injection moulded part and lead to aesthetic and mechanical shortcomings, which cannot be tolerated. A person skilled in the art and in injection moulding technology knows that the injection moulding tool must now be cleaned. The person can now carry out this itself without having to send the injection moulding tool back to the mould manufacturer. For this, he separates the different plates of the injection moulding tool according to this invention, in order remove the various exchangeable inserts by way of ejection screws and to then clean the respective hot runner feed conduits 5.

For this, the person does not need to drill out a plug and insert a new one again. Of course, the person can also clean the exchangeable inserts itself. However, the tool manufacturer can indeed also co-deliver a complete set of exchangeable inserts for the respective injection moulding tool, in order however to reduce the stoppage time of the tool, so that the injection moulding business merely needs to clean through the conduits and then exchange the set of co-delivered, exchangeable inserts. It then assembles the injection moulding tool again thereafter.

A mould manufacturer, who manufactures the injection moulding tool of the type according to this invention, would standardize the exchangeable inserts. Basically, hot runner conduits, which is to say hot runners, with only three to four different diameters are required for example, depending on the tool size. Thus with this, it is conceivable for business to manufacture the exchangeable inserts for example of sintered material in a large scale manufacture or also, with regard to moulding technology, to have such metallic exchangeable inserts manufactured, for the common sizes of injection moulding tools. However, one would always manufacture such inserts in a self-produced and machining manner, for more sophisticated injection moulding tools.

The bores must be led through from the one surface to the other surface in a complete manner, so that one can clean the hot runner feed conduits which run is a straight, but inclined manner in the respective plate, without any problem. The recesses, into which these bores run out however, do not need to be so large that the exit surface of this continuous bore runs out completely in the region of the recess. This indeed can be recognized in FIG. 2, for example. Thus in FIG. 2, one can recognize that the hot runner feed conduit 5 although running out completely within the recess 30, however basically crosses this recess and exits again at 16. The exchangeable insert 10 however does not close off this bore exit region 16, and as a result it is of no significance as to whether the exit surface of the bore lies completely within the base surface of the recess 30 or extends out of this. The exchangeable inserts are not a hindrance on cleaning the hot runner feed conduits since the exchangeable these inserts 10 are removed for the cleaning.

The invention claimed is:

1. An injection moulding tool (1) comprising: at least one central feed conduit (2), at least two plates (3, 4) arranged one over another and each including at least one hot runner feed conduit (5) with a branching point at each end, in which a direction change and/or a division of the at least one hot runner feed conduit (5) is affected, for feeding a hot injection moulding mass to two or more cavities (6), the at least one hot runner feed conduit (5) in each of the two plates (3, 4) of the injection moulding tool (1) running in a straight line from an upper plate surface (7) to a lower plate surface (8) and inclined between the upper plate surface (7) and the lower plate surface (8) and running out into exchangeable inserts (10) at least at one of the upper plate surface (7) and the lower plate surface (8), and in the inserts the division or the direction change of a corresponding hot runner feed conduit (5) is affected.

2. An injection moulding tool (1) according to claim 1, wherein the at least one central feed conduit (2) runs vertically in a sprue bush (20) and runs out into a first, exchangeable insert (10) which is recessed in a flush manner in the upper plate surface (7) of an upper of the two plates (3) which is located below the central feed conduit (2), and wherein the exchangeable insert (10) is formed as a manifold insert (11).

3. An injection moulding tool (1) according to claim 2, wherein at least two hot runner feed conduits (5) run from the first exchangeable insert (10) which is recessed in a flush manner in the upper plate surface (7) of the upper of the two plates (3), in a straight and inclined manner through the upper of the two plates (3) and run out into exchangeable inserts (10) at the lower plate surface (8) of the upper of the two plates (3) which are recessed in a flush manner there, and the inserts are manifold inserts or deflection inserts (11, 12).

4. An injection moulding tool (1) according to claim 1, wherein a manifold insert (11) is recessed in a flush manner in the upper plate surface (7) of each of the two plates, and deflection inserts (12) are in each case recessed in a flush manner in the lower plate surface (8) of each of the two plates (3, 4).

5. An injection moulding tool (1) according to claim 1, wherein the exchangeable inserts (10) are non-positively and/or positively held in each of the two plates (3, 4).

6. An injection moulding tool (1) according to claim 1, wherein the exchangeable inserts (10) comprise side surfaces running perpendicularly to the lower or the upper plate surfaces (7, 8) of each of the plates (3, 4).

7. An injection moulding tool (1) according to claim 1, wherein each of the exchangeable inserts (10) include at least one side wall which serves as a run-out surface or an exit surface (13) and which is in contact with one of the hot runner feed conduits (5) running in an inclined, manner, and which is inclined to run perpendicularly to a running direction of a corresponding hot runner feed conduit (5).

8. An injection moulding tool (1) according to claim 1, wherein perpendicularly running ejection bores (14) which run out in recesses (30), in which the exchangeable inserts (10) are mounted, are incorporated in each of the two plates (3, 4).

9. An injection moulding tool (1) according to claim 8, wherein the ejection bores (14) have an inner thread, in which an ejection screw (15) can he inserted, by which the exchangeable insert (1) is held on a corresponding one of the plates (3, 4) by three or for cleaning can be ejected out of the corresponding one of the plates (3, 4), in which the exchangeable insert (10) is mounted.

10. An injection moulding tool (1) according to claim 1, wherein the exchangeable inserts (10) are manufactured of metal in a machining manner.

11. An injection moulding tool (1) according to claim 1, wherein the exchangeable inserts (10) are sintered or cast from a metal.

12. An injection moulding to (1) according to claim 1, wherein the exchangeable inserts (1) are of ceramic.

13. An injection moulding tool (1) according to claim 9, wherein the exchangeable inserts arc designed and mounted symmetrically to a longitudinal axis of the ejection bore, and the ejection screw (14) is thus directed to a center of the insert.

14. An injection moulding tool (1) according to claim 4, wherein one of the deflection inserts (12) of the lower plate surface (8) of an upper plate of the two plates (3) is connected to the manifold insert (11) in the upper plate surface (7) of a lower plate of the two plates (4).

15. An injection moulding tool comprising:
at least one central feed conduit;
a first plate having a first plate upper surface and a first plate lower surface, and including at least one first plate hot runner feed conduit extending through the first plate in a straight line and inclined between the first plate upper surface and the first plate lower surface;
a second plate having a second plate upper surface and a second plate lower surface, and including at least one second plate hot runner feed conduit extending through the second plate in a straight line and inclined between the second plate upper surface and the second plate lower surface, the second plate being arranged under the first plate;
a plurality of exchangeable inserts each adapted to affect a division and/or a direction change of a hot injection moulding mass through the injection moulding tool, wherein each of the at least one first plate hot runner feed conduit and the at least one second plate hot runner feed conduit includes a first end and a second end each connected to one of the plurality of exchangeable inserts to feed the hot injection moulding mass to two or more cavities.

16. An injection moulding tool according to claim 15, wherein the second plate comprises two straight and inclined second plate hot runner feed conduits, and the plurality of exchangeable inserts includes a deflection insert recessed in a flush manner in the first plate lower surface, and a manifold insert recessed in a flush manner in the second plate upper surface and connected to each of the two second plate hot runner feed conduits of the second plate, wherein the deflection insert connects to each of the two second plate hot runner feed conduits via the manifold insert to pass the hot injection moulding mass from the first plate to the second plate.

* * * * *